Figure 1:
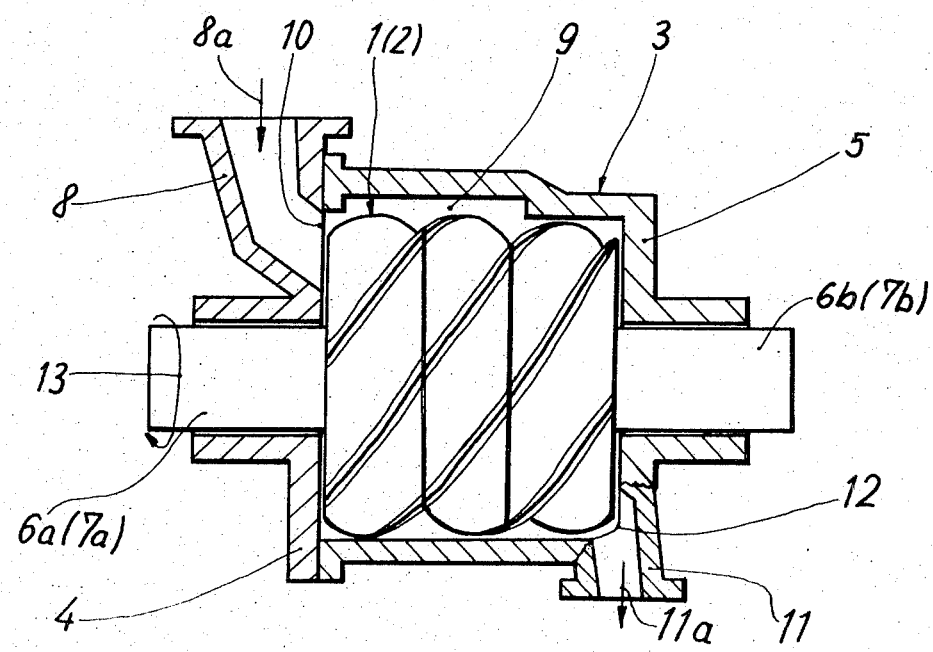

United States Patent [19]

Spindler

[11] 3,867,076
[45] Feb. 18, 1975

[54] SCREW COMPRESSOR WITH ROTOR SECTIONS

[75] Inventor: Walter Spindler, Munich, Germany

[73] Assignee: H & H Licensing Corporation, Miami, Fla.

[22] Filed: Jan. 17, 1974

[21] Appl. No.: 434,300

[30] Foreign Application Priority Data
Jan. 22, 1973 Germany............... 2302902

[52] U.S. Cl. .................................. 418/201
[51] Int. Cl. ................................... F04c 1/10
[58] Field of Search ........... 418/197, 201, 202, 203; 74/439, 444, 445

[56] References Cited
UNITED STATES PATENTS
719,572  2/1903  Evenden ............... 74/445
3,424,373  1/1969  Gardner ............... 418/201

Primary Examiner—C. J. Husar
Assistant Examiner—Leonard Smith
Attorney, Agent, or Firm—Millen, Raptes & White

[57] ABSTRACT

A screw compressor, screw pump expansion engine operating on the screw principle, or the like cooperating rotors with a casing, the rotors comprising individual rotor sections arranged axially along respective shafts and having intermeshing helical thread formations at the outer periphery thereof and with the rotor sections along one shaft being axially offset relative to adjacent rotor sections on another shaft to present intermeshing surfaces for transmitting torque therebetween from one rotor section fixed to one of the shafts which is to be positively driven.

10 Claims, 2 Drawing Figures

SCREW COMPRESSOR WITH ROTOR SECTIONS

BACKGROUND OF THE INVENTION

This invention relates to a screw compressor, a screw pump, or the like with a casing and rotors, wherein the rotors are composed of individual rotor sections, respectively arranged in series axially on a rotor shaft, with meshing screw threads, respectively, at their outer peripheries. Furthermore, the scope of protection of this invention is to cover basically also expansion engines operating in accordance with the screw principle.

Screw compressors are in many cases preferably employed for the compression of gaseous media. These machines are relatively economical, safe in operation, and quite in running. In the operating chamber of these engines, the gaseous medium is compresssed in a known manner by being forces continuously through respectively two interlocking screw threads of two rotors disposed in a casing, from the suction side to the pressure side of the compressor, the volume of the compressor threads containing the gas or the air being respectively reduced.

Considering the cost of construction required for screw compressors, the rotors provided along their circumference with meshing screw threads, respectively, play an important part. The rotors are in many cases formed integrally over the entire length, the screw threads of the rotors being normally cut by milling. Such a manufacturing method is very expensive. Therefore, attempts have been made to reduce the production costs for screw compressor rotors by composing the rotors of several axially series-arranged rotor sections, wherein the individual rotor sections are provided in each case at their external circumference with corresponding male and female screw threads. Such shorter rotor sections can be manufactured by simpler methods, for example, by sintering, rolling, or pressing, and thus less expensively. However, it was found that the assembly of the individual rotor sections to a rotor causes problems, in view of the oftentimes extreme operating conditions to which screw compressors are subjected.

It is conventional to connect the individual rotor sections by peripheral welding. Apart from the fact that such continuous weld seams represent a considerable production expense, it was found that the welding bond ruptures, due to the thermal stresses occurring during the operation of the compressor. The pitch of the screw threads formed by the joining of the rotor sections is changed by the deformation. The torsion angle of the driving or driven rotor and the form of the ridges and grooves constituting the screw threads thereof differ from each other. Consequently, the clearance between the ridges and grooves of the two rotors, required for a normal compressor operation, cannot be maintained with certainty, and the rotors are thus jammed or seized.

It is furthermore known to weld the rotor sections, each of which has a central bore, along their inner peripheries, where, as is known, the conditions, especially the temperature relationships, are not so extreme as on the outer, threaded circumference of the rotor sections. In this arrangement, narrow interstices between the individual rotor sections have furthermore been provided more toward the outside in the zone of particularly large temperature fluctuations. However, this method of assembly likewise has the disadvantage that the welding is an expensive part of the manufacturing process. Besides, the problem of the rotor stresses occurring due to the extreme operating conditions in the screw compressor is not solved satisfactorily in this structure, either.

Finally, it is known to fixedly connect the rotor sections of a rotor by continuous pins extending axially therethrough, wherein the rotor sections are simultaneously secured against twisting movements. For this purpose, the pins are passed through corresponding perforations provided in all rotor sections and are riveted or screwed together with the two terminal disks. It can readily be seen that this connecting method for the rotor sections likewise has substantial disadvantages. First of all, the manufacturing expenditure is not inconsiderable, because of the perforations which must be accurately provided in all rotor sections. Secondly, this conventional arrangement does not afford a satisfactory safety in operation, especially due to the thermal stresses occurring during the compressor operation.

SUMMARY OF THE INVENTION

The present invention is based on the problem of providing a simple and efficient screw compressor, screw pump, or the like with a casing and rotors, wherein the rotors are composed of individual rotor sections respectively arranged axially in series on a rotor shaft, with meshing screw threads, respectively, arranged at their outer peripheries, wherein the disadvantages of the conventional rotary-piston-type engines are avoided.

This problem is solved, in accordance with the invention, by providing that the rotor sections of the two rotors are arranged axially offset with respect to each other, wherein one rotor section is mounted fixedly on the rotor shaft, connected to a drive engine, for rotation therewith and all other rotor sections are arranged on the two rotor shafts for rotation independently of one another so that a torque applied to the fixedly mounted rotor section is continuously transmitted from one rotor section to the opposed one. Advantageously, one rotor shaft, provided with its rotor sections is joined to a drive engine and disposed rotatably in the compressor casing, and the other rotor shaft provided with its rotor sections is nonrotatably mounted in the compressor casing, perferably by means of an angular shape of the ends of the rotor shaft.

The structure and mode of operation of the rotary-piston engine of the present invention differ quite basically from the known engines, and a rotary-piston engine according to this invention has essential advantages over the conventional engines due to its special structure and operation. An optimum compression characteristic is ensured, in spite of the fact that in a screw compressor of this invention only one rotor section is fixedly mounted for rotation especially on the driven rotor shaft, and all other rotor sections are disposed respectively on their rotor shaft to be rotatable independently of one another. The driven rotor section, fixedly mounted on the driven rotor shaft for rotation therewith, transmits the torque to at least one rotor section on the other shaft meshing with this driven rotor section and rotatably disposed in an axially offset relationship therewith. Due to the axially offset and lapping arrangement, this rotor section transmits the torque to the subsequent rotor section on the driven shaft, meshing with this rotor section and rotatably arranged on the driven rotor shaft; this rotor section on the driven shaft, in turn, drives the subsequent rotor section on the other shaft, and so forth. In this way, all series-disposed rotor sections of one rotor mesh, without any direct mutual dependency, with the respectively associated rotor sections of the other rotor. As a result, any deformations occurring due to different thermal expansions especially at the screw threads of the rotor sections, or other pitch flaws, can indeed be compensated for, in contrast to the conventional screw compressors, namely in a particularly simple manner, since according to this invention the individual meshing rotor sections can respectively adapt to one another. However, even deformations in the axial direction are compensated for in a simple manner in the screw compressor of the present invention, in that the individual rotor sections, contrary to the known screw compressors, are not directly joined with one another in the axial direction, either, but there is ordinarily even a small axial clearance between the individual rotor sections over the entire cross sections thereof.

The fixed mounting of the one male rotor section for rotation with the male rotor shaft, which is advantageously the section closest to the drive engine, can be effected in various keying ways, for example by means of a groove and an adjusting spring. Correspondingly, the bearing of the rotor sections individually rotatable on the respective shaft can basically be effected as a sliding bearing or also with antifriction bearings.

The assembly of the rotors of this invention from individual rotor sections is, accordingly, especially simple in total and avoids, above all, the conventional complicated welding steps. This construction affords great safety in operation, even under the most extreme operating conditions, and correspondingly provides a long lifetime for a screw compressor of this invention, so that it is also very economical.

A troublefree operation of the screw compressor of this invention takes place if the axial length of the individual rotor sections, as well as the axial displacement between the mutually associated rotor sections is at least so large that a torque transmission is respectively possible between the two rotors. At least in case of certain rotor profiles, i.e., cross-sectional configurations of the ridges and grooves forming the meshing screw threads, respectively, as seen in a radial sectional view, there is a rotary angle range wherein no torque is transmitted because of the geometry of the profile. If, according to the invention, with a given pitch angle, the axial length of the individual rotor sections and the axial displacement between the mutually associated rotor sections are chosen to be so large that a torque transmission is possible between the two respective rotors, then the use of these rotor profiles is especially possible also in connection with the present invention. The torsion angle per displacement in this case always exceeds the rotary angle range wherein no torque transmission can be effected.

According to an advantageous embodiment of this invention, the axial displacement between the mutually associated rotor sections of the two rotors correspond, at least predominantly, to half the axial length of the individual rotor sections. In this way, a particularly uniform, symmetrical load on the individual rotor sections is ensured, resulting in an even further increased operational safety.

Figure 2:
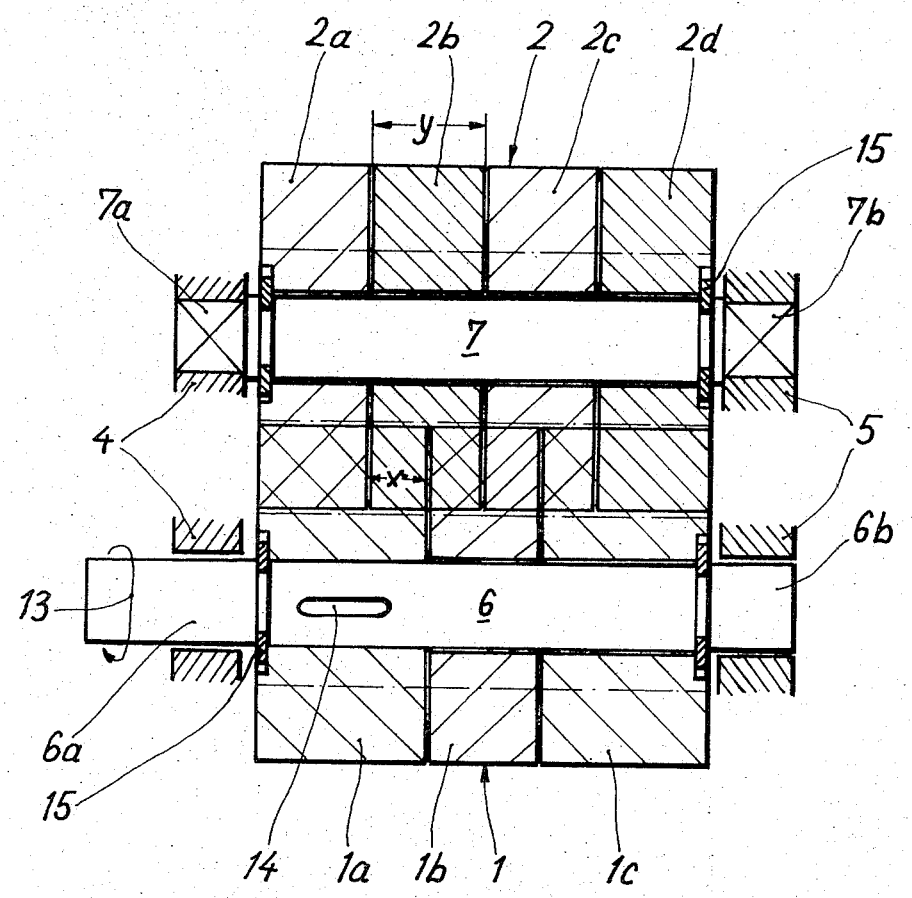

The invention will be explained in greater detail below with reference to an embodiment schematically illustrated in the drawings, to wit:

FIG. 1 shows an axial longitudinal sectional view of a screw compressor of this invention with rotors composed of individual rotor sections, and FIG. 2 shows the screw compressor of FIG. 1 in an axial horizontal sectional view.

FIG. 1 illustrates a screw compressor of this invention in a schematic longitudinal section as an introduction to this invention, for a cursory explanation of its structure and mode of operation. The screw compressor of FIG. 1 has a first rotor 1 and a second rotor 2 (not illustrated) which are disposed coaxially in corresponding continuous cylindrical bores of a compressor housing 3. The housing 3 has respectively one end wall on the intake side, denoted by 4, and on the delivery side, denoted by 5. In the end walls 4 and 5, the shafts 6 and 7 of the rotors 1 and 2 are disposed; in particular, the intake-side rotor shaft ends 6a and 7a (not illustrated) in the end wall 4, and the delivery-side rotor shaft ends 6b and 7b, respectively (not illustrated) in the end wall 5. Furthermore, an intake pipe 8 is provided in the end wall 4 of the housing on the intake side; this pipe is in communication with the operating chamber 9 of the screw compressor via an intake port 10. Finally, a high-pressure pipe connection 11 is associated with the housing, which connection adjoins the housing end wall 5 on the delivery side and is connected to the operating chamber 9 by way of a high-pressure port 12.

The shaft end 6a of the rotor shaft 6 on the suction side is connected, in order to drive the screw compressor, to a drive engine, not shown. Upon the activation of the compressor, the rotors 1 and 2 rotate in opposite directions (see arrow 13 showing the rotation of the rotor 1). During this operation, gas is taken in due to the intake pressure according to arrow 8a through the intake pipe 8 and the intake port 10 into the operating chamber 9 of the compressor. In the operating chamber 9, the gas is conventionally compressed by being forced continuously through respectively two interlocking screw threads from the suction side to the delivery side, the volume of the compression threads containing the gas being continually reduced. At the delivery side of the screw compressor, the gas, brought to the compression pressure, if forced from the respectively last compression thread through the high-pressure port 12 arranged in the end wall 5 of the housing on the delivery side into the high-pressure pipe connection 11, through which it passes on to the consumer in accordance with arrow 11a.

As merely indicated in FIG. 1, in the screw compressor of the present invention, the rotors 1 and 2 are each composed of several axially series-disposed rotor sections. The present invention relates particularly to the assembly of the rotors 1 and 2 from these rotor sections. In FIG. 2, greater detailed of the invention are illustrated with the use of an axial horizontal section through the screw compressor of this invention. For the sake of simplicity, all other details, for example essentially the rotor housing, are indicated only schematically or have been omitted altogether.

In the screw compressor of the present invention, the rotors 1 and 2 are respectively composed of individual rotor sections 1a, 1b, 1c as a first group, and 2a, 2b, 2c, 2d as a second group, each seated in axial series on a rotor shaft 6 and 7, respectively. These rotor sections carry on their outer peripheries intermeshing thread formations, respectively, indicated by dot-dash lines. The rotor sections 1a, 1b, 1c and 2a, 2b, 2c, 2d of the two rotors 1 and 2, respectively, are arranges so that they are mutually staggered or offset relative to one another to present intermeshing lapping surfaces in the axial direction.

The rotor section 1a is fixedly arranged for rotation on the rotor shaft 6 by key means such as an adjusting spring 14; this rotor shaft is connected at its end 6a on the intake side with a drive engine, not shown. All other rotor sections 1b, 1c abd 2a, 2b, 2c, 2d, however, are rotatably mounted independently of one another on their rotor shafts 1 and 2, respectively. The rotor shaft 6 provided with the male rotor sections 1a, 1b, 1c is rotatably mounted in the housing end wall 4 on the intake side and in the housing end wall 5 on the delivery side. In contrast thereto, the rotor shaft 7 provided with the rotor sections is nonrotatably secured in the housing end wall 4 on the suction side and the end wall 5 on the delivery side. For this purpose, the end 7a of the rotor shaft on the intake side and the end 7b of the rotor shaft on the delivery side are both polyhedrons.

The axial length, e.g., y, of the individual rotor sections, e.g., 1b, 2a, 2b, 2c, 2d, as well as the axial extent of offset, e.g., x, between the mutually associated rotor sections, e.g., 2b and 1b, are at least of sufficient extent so that effective torque transmission is provided between the two rotors 1 and 2.

The axial offset x between all mutually associated rotor sections of the two rotors 1 and 2 corresponds, in the illustrated example, to one-half the axial length y of the shorter rotor sections, for example 2b. This results, for the individual rotor sections, in a substantially uniform, symmetrical load, whereby the operational safety of the screw compressor of the present invention is still further enhanced.

The mode of operation of the rotor arrangement of the screw compressor according to this invention is as follows:

When the rotor shaft 6 rotatable in the compressor casing 4, 5 is driven in the direction of rotation according to arrow 13, only the rotor section 1a, fixedly joined to the shaft, is set into rotation together with the shaft directly. The rotor section 1a, however, transmits a torque to the rotor sections 2a and 2b, which are in meshing engagement with the section 1a and are rotatable on the rotor shaft 7 nonrotatably mounted in the compressor housing 4, 5. The rotor section 2b, in turn, transmits a torque to the rotor section 1b meshing therewith and rotatable on the rotor shaft 6. The further torque transmission takes place, in brief, from the rotor section 1b to the rotor section 2c, from the latter to the rotor section 1c, and from the lastmentioned section finally to the rotor section2d.

In this connection, it should be emphasized once again that all axially series-disposed rotor sections, as also indicated in the drawing, have a certain mutual axial clearance, rather than being axially braced with respect to one another by the securing rings 15 or the like, which latter serve merely for axially fixing the arrangement at the ends of the device.

In view of the aforedescribed mode of operation of the rotor arrangement according to the screw compressor of this invention, it can readily be seen that this rotor arrangement is distinguished especially by the following advantages:

The series arrangement of the groups of individual rotor sections 1a, 1b, 1c and 2a, 2b, 2c, 2d, respectively, on their rotor shafts 6 and 7 requires only a minor expenditure in structure. Expensive welding bonds are eliminated, in particular. At the same time, the rotor arrangement of this invention provides increased safety in operation, especially since the individual rotor sections 1a, 1b, 1c and 2a, 2b, 2c, 2d can especially well compensate for peripheral as well as axial disturbances, particularly any occurring different thermal expansions or any pitch flaws with may be present.

what is claimed is:

1. Screw compressor, screw pump, or the like, including a casing with spaced shaft means mounted therein and carrying cooperating rotors with intermeshing helical screw thread formations; each rotor comprising a group of individual rotor sections arranged in series axially along a corresponding shaft and presenting the intermeshing thread formations, the rotor sections of one group being axially offset relative to adjacent rotor sections of another group to provide axially lapping and meshing surface areas therebetween, a rotor section of one group being fixed to its associated shaft which is adapted to be driven from a drive mechanism for rotating the same, and the remaining rotor sections of each group being mounted for rotation independently of the associated shafts for transmission of torque from the shaft-fixed rotor section continuously through the next succeeding lapping and meshing sections of each group.

2. Screw compressor, screw pump or the like according to claim 1, wherein the shaft carrying the group of rotor sections including the shaft-fixed section is rotatable in the casing, and wherein the shaft carrying the other group of rotor sections is non-rotatably mounted in the casing.

3. Screw compressor, screw pump or the like according to claim 1, wherein there is slight axial play at least between intermediate rotor sections of each group to compensate for encountered working conditions.

4. Screw compressor, screw pump or the like according to claim 1, wherein the minimum axial length of the rotor sections of each group is of sufficient extent to present lapping and meshing surface areas between mutually associated rotor sections for effective transmission of torque therebetween.

5. Screw compressor, screw pump or the like according to claim 4, wherein the lapping surface areas between cooperating rotor sections is substantially one-half the axial length of the rotor sections.

6. Screw compressor, screw pump or the like according to claim 1, wherein the shaft-fixed rotor section of one group interengages with a pair of rotor sections of the other group of rotor sections.

7. Screw compresssor, screw pump or the like according to claim 6, wherein the shaft-fixed rotor section is at one end of its associated shaft and wherein the rotor section at the opposite end of said associated shaft interengages with a pair of rotor sections of the other group.

8. Screw compressor, screw pump or the like according to claim 7, wherein the intermediate rotor sections of each group are of lesser axial extent than the end rotor sections of the group including the shaft-fixed rotor section.

9. Screw compressor, screw pump or the like according to claim 8, wherein the lapping and meshing surfaces areas of the intermediate rotor sections of each group is approximately one-half the axial length of the said intermediate rotor sections.

10. Screw compressor, screw pump or the like according to claim 9, wherein the shaft carrying the said end rotor sections of one group is rotatably mounted in the casing, and wherein the shaft carrying the other group of rotor sections is fixedly mounted in the casing against rotation.

* * * * *